United States Patent [19]

Mlinaric et al.

[11] Patent Number: 4,647,999
[45] Date of Patent: Mar. 3, 1987

[54] FRAME FOR POSITIONING TRANSDUCING HEAD

[75] Inventors: Antoon A. Mlinaric, San Carlos; Donald F. Neumann, Redwood City, both of Calif.

[73] Assignee: Datatape Inc., Pasadena, Calif.

[21] Appl. No.: 677,359

[22] Filed: Dec. 3, 1984

[51] Int. Cl.⁴ ............................................. G11B 5/56
[52] U.S. Cl. ................................... 360/109; 360/107; 360/77
[58] Field of Search ................. 360/107, 106, 109, 75, 360/76, 77, 78, 70

[56] References Cited

U.S. PATENT DOCUMENTS

| 4,080,636 | 3/1978 | Ravizza | 360/107 X |
| 4,093,885 | 6/1978 | Brown | 310/331 |
| 4,099,211 | 7/1978 | Hathaway | 360/109 |
| 4,184,183 | 1/1980 | Dolby | 360/107 |
| 4,268,880 | 5/1981 | Majima | 360/107 X |
| 4,438,469 | 3/1984 | Ohba et al. | 360/109 |
| 4,542,429 | 9/1985 | Nishida et al. | 360/75 X |

FOREIGN PATENT DOCUMENTS

| 0026524 | 8/1981 | European Pat. Off. . |
| 1120657 | 7/1968 | United Kingdom . |
| 2050671 | 1/1981 | United Kingdom . |
| 2076578 | 12/1981 | United Kingdom . |

Primary Examiner—Robert S. Tupper
Assistant Examiner—Andrew L. Sniezek
Attorney, Agent, or Firm—Steve W. Gremban

[57] ABSTRACT

In a system mounting a transducer on the end of a frame for sweeping motion displacement laterally to a track on a record surface, the frame has arms connected to a fixed support. The frame may include a torsion member connected to a driver for rotation therewith and a rigid member rigidly connected to the free ends of the arms causing the frame arms to form an "S" shaped curve. The transducer is connected to a mounting member rigidly connected to the free end of the frame. The frame causes the transducer to remain in an orientation at a selected angle to the record surface.

7 Claims, 19 Drawing Figures

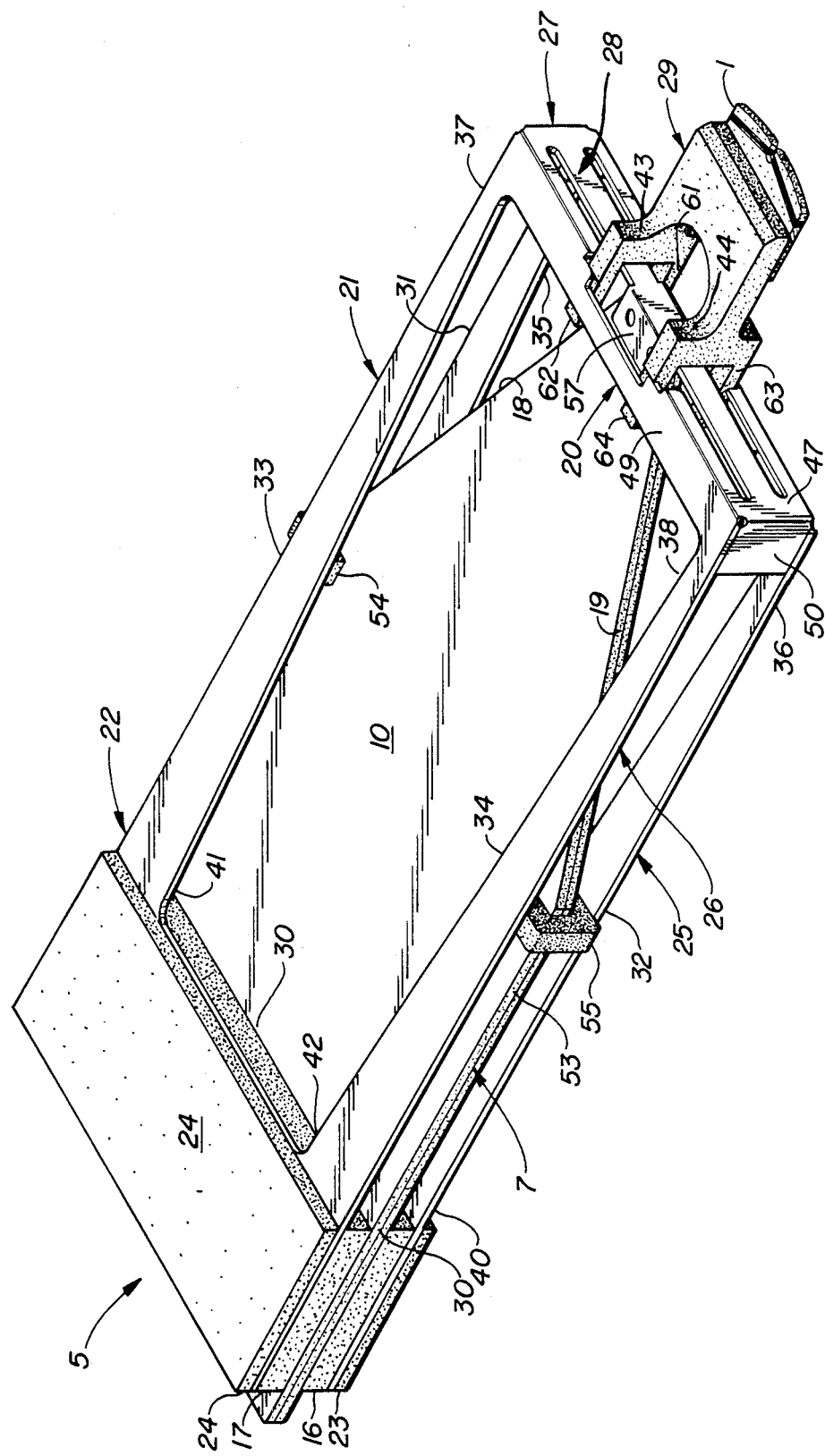
FIG._1.

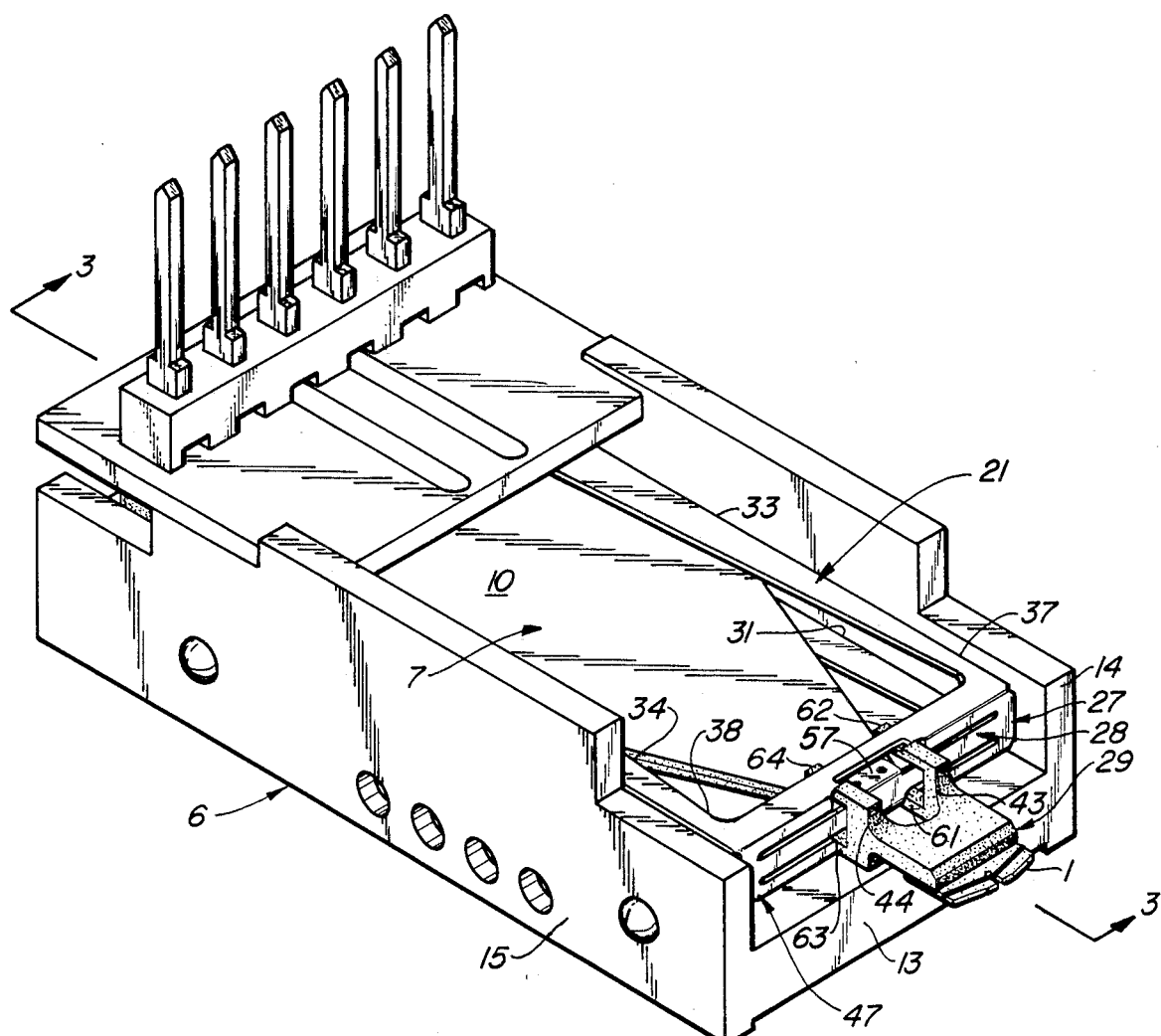
FIG._2.
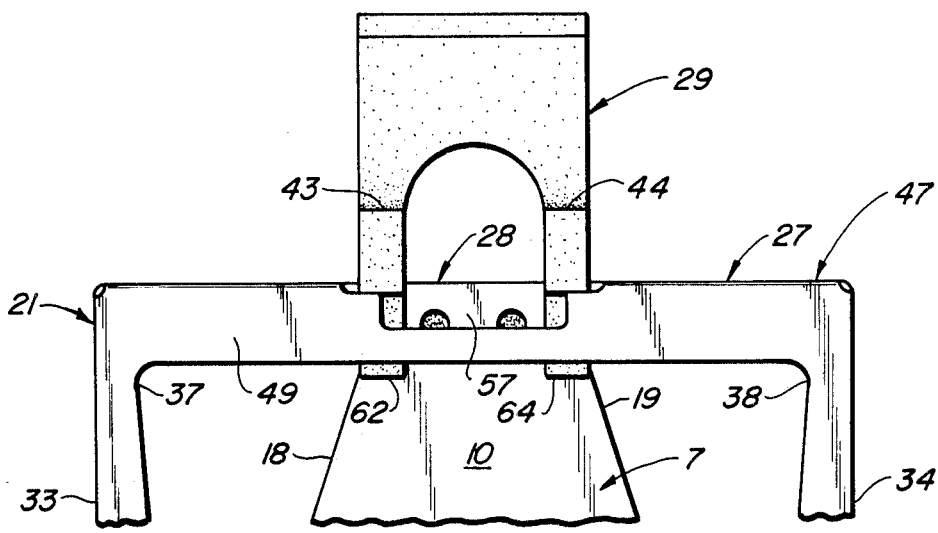
FIG._4.

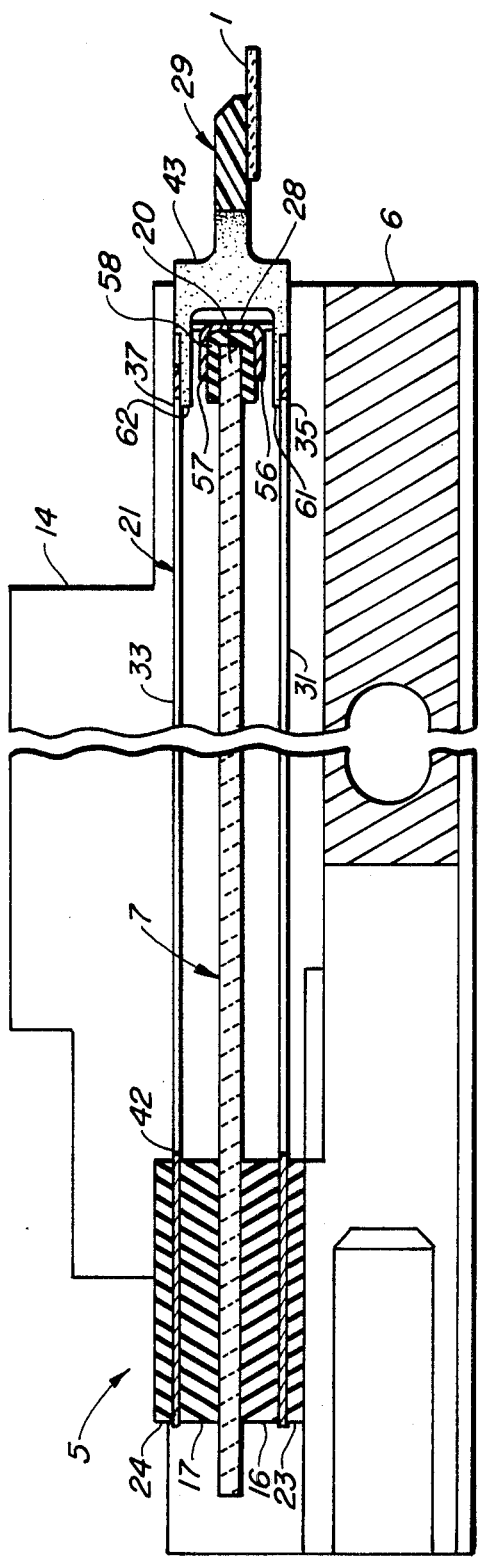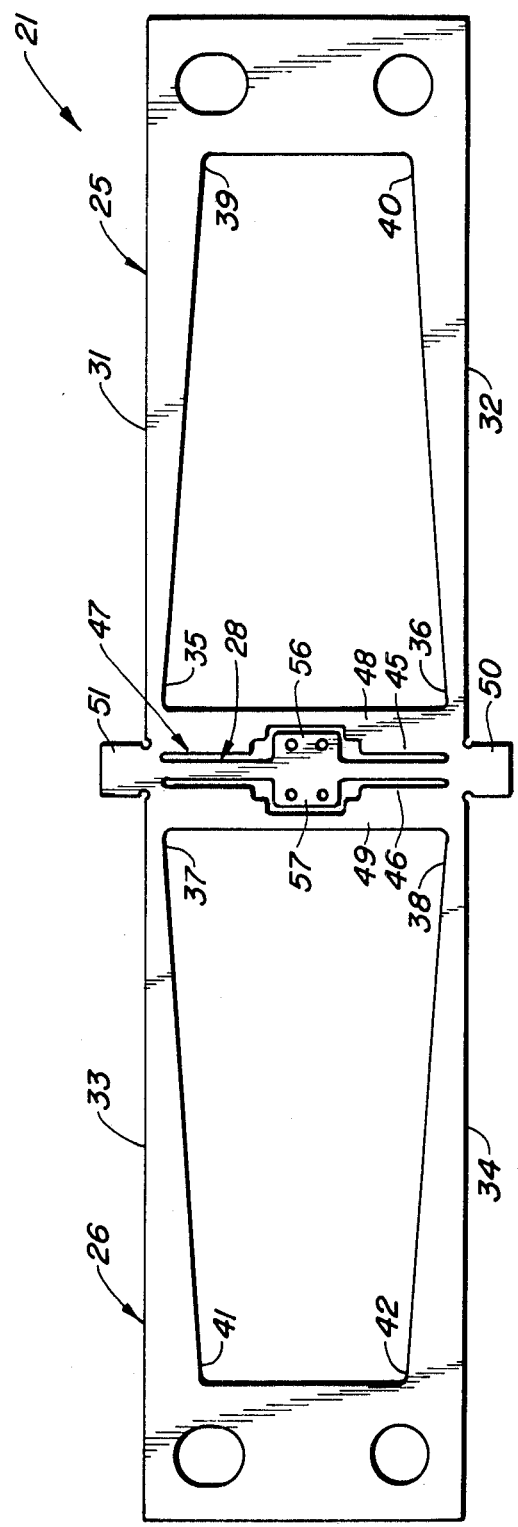

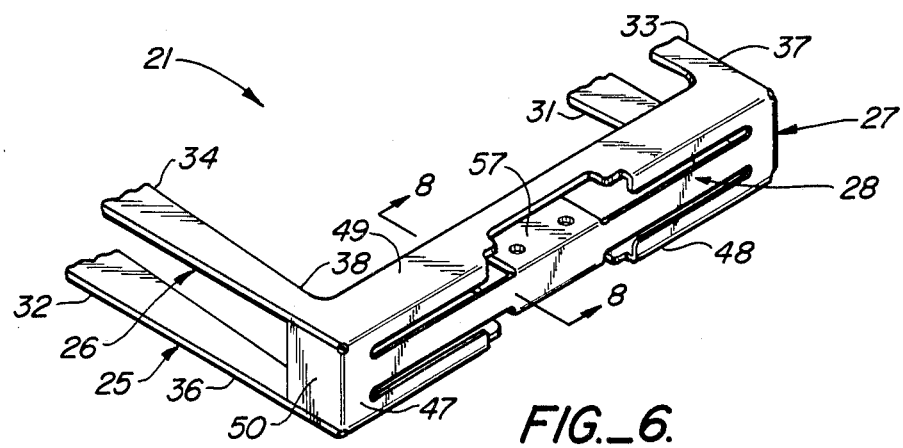
FIG._6.
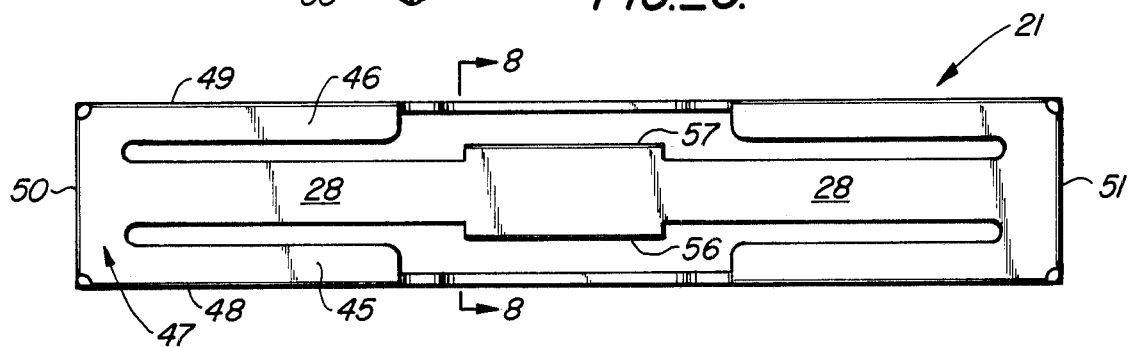
FIG._7
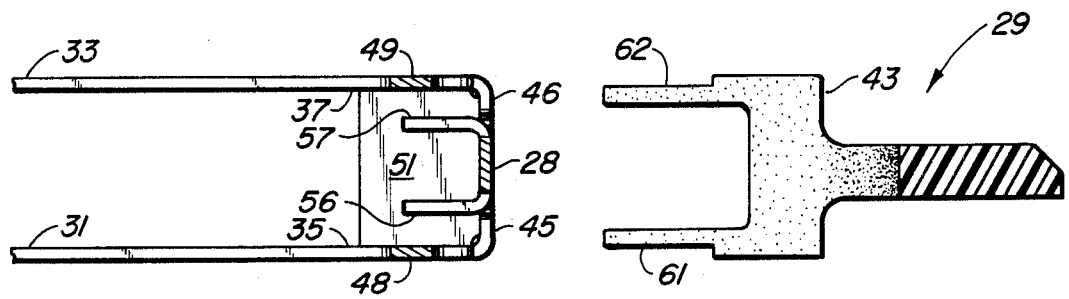
FIG._8.
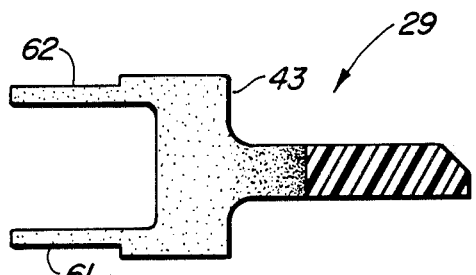
FIG._9.
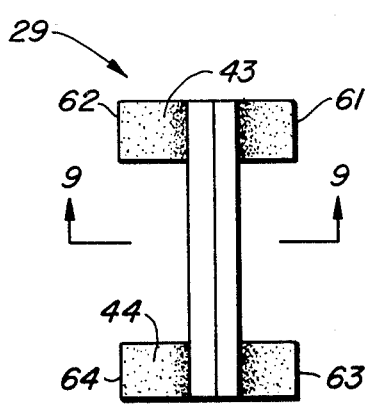
FIG._11.
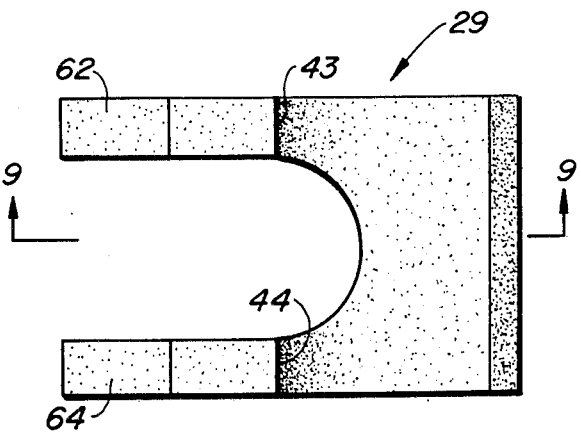
FIG._10.

U.S. Patent   Mar. 3, 1987   Sheet 5 of 5   4,647,999
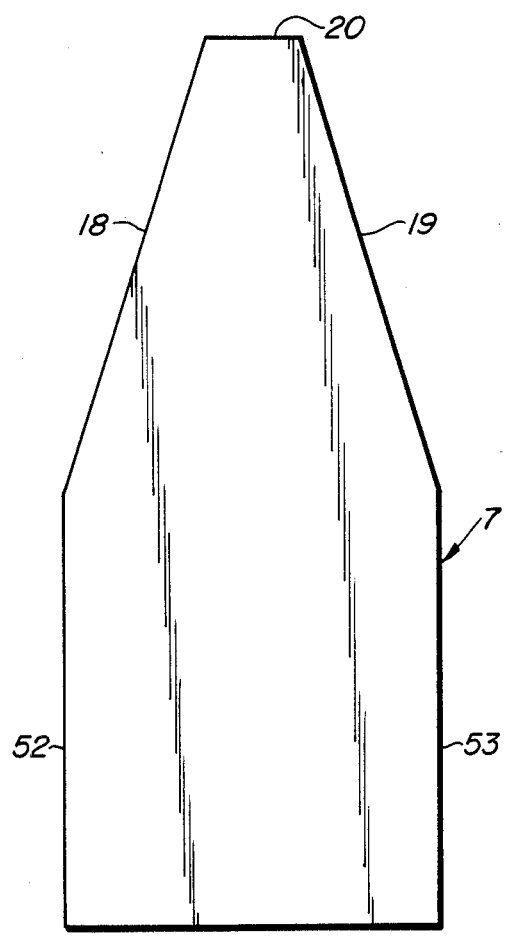
FIG._12.
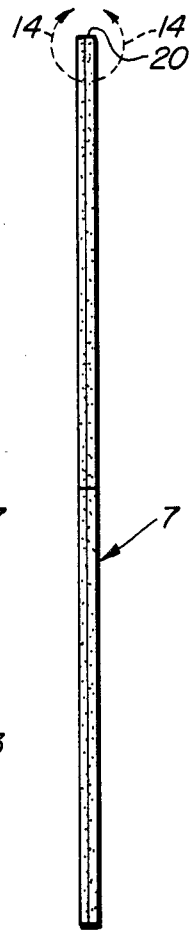
FIG._13.
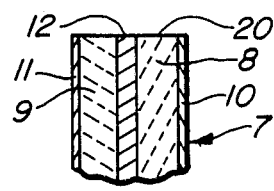
FIG._14.
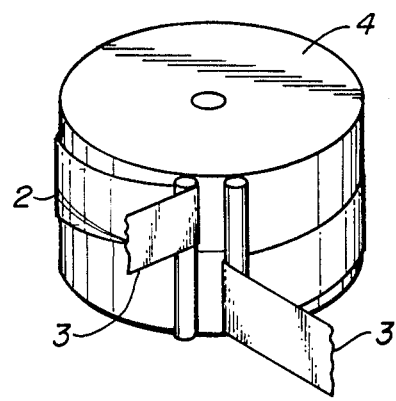
(PRIOR ART)
FIG._15.
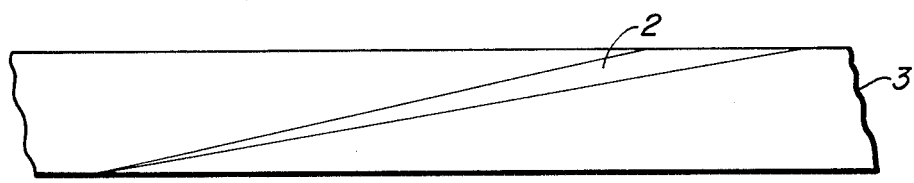
(PRIOR ART) FIG._16.
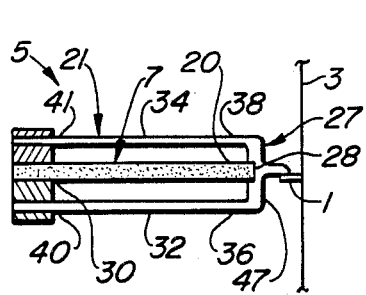
FIG._17.
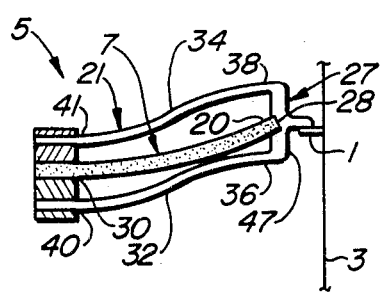
FIG._18.
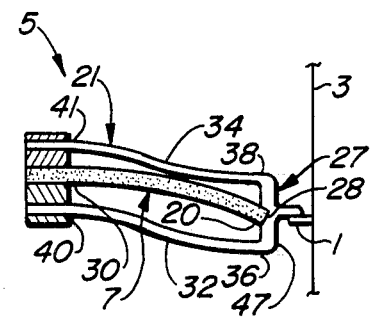
FIG._19.

4,647,999

FRAME FOR POSITIONING TRANSDUCING HEAD

BACKGROUND OF THE INVENTION

This invention relates to a positionable transducer and particularly to the structural frame for maintaining the transducer in an orthogonal relationship with respect to an elongated track upon a record medium surface such as video tape.

U.S. Pat. No. 4,093,885 granted to David E. Brown, June 6, 1978 and assigned to Ampex Corporation describes a TRANSDUCER ASSEMBLY VIBRATION SENSOR used to read and record with respect to a videotape helically wrapped on a drum as shown in Prior Art FIGS. 15 and 16. The problem with the Brown mounting structure was the fact that as the cantilevered positioning element or driver deflected, the transducer at the free end of the cantilever tilted at an angle with respect to the video tape. The amount of inclination varied proportionately to the amount of deflection of the positioning element. Since electrical signal degradation is logarithmic relative to inclination, it is extremely important to maintain the transducer in orthogonal relationship to the video tape.

Hathaway, U.S. Pat. No. 4,099,211 granted July 4, 1978 and assigned to Ampex Corporation, teaches a POSITIONABLE TRANSDUCING MOUNTING STRUCTURE AND DRIVING SYSTEM THEREFOR. The Hathaway positioning means discloses a complex method of dividing the positioning member which is more specifically a piezoelectric ceramic bender element, into two physically distinct members and two separate electrically isolated elements. The separate elements are oppositely electrically charged to cause them to bend in opposite directions as the divided positioning element deflects. The voltage must be carefully regulated to cause the correct degree of bending as the deflection increases. Hathaway also recognized that his positioning element had a tendency to twist and he therefore divided his positioning member longitudinally into two electrically isolated elements so that oppositely charged driving voltage could be applied to cause the elements to bend in opposite directions.

SUMMARY OF THE INVENTION

The gist of the present invention is the provision of a frame for mounting the piezoelectric ceramic bender element or driver so that it will automatically and mechanically position the transducer orthogonally to the video tape. The frame eliminates the need for electrical means for supplying voltage to the positioning means to cause it to bend in an "S" curve as required in the Hathaway device.

The frame is constructed so that twisting is minimized and there is no need for any expensive electrical apparatus to compensate and counteract the twisting that occurs in the Hathaway device.

BRIEF DESCRIPTION OF THE DRAWINGS

FIG. 1 is a perspective view of the positioning frame of the present invention with the driver and transducer mounted thereon.

FIG. 2 is a perspective view of the frame, driver and transducer of FIG. 1 mounted in a mounting assembly.

FIG. 3 is a cross sectional view taken along line 3—3 of FIG. 2.

FIG. 4 is a partial top plan view of the frame, driver and transducer as shown in FIG. 1.

FIG. 5 is a plan view of the frame member prior to bending.

FIG. 6 is a perspective view of a portion of the frame after bending.

FIG. 7 is an enlarged front view of the frame of FIG. 6.

FIG. 8 is a cross sectional view of a portion of the frame taken along line 8—8 of FIG. 7.

FIG. 9 is a side view of the transducer mount member.

FIG. 10 is a top view of the transducer mount member of FIG. 9.

FIG. 11 is a front view of the transducer mount member of FIG. 9.

FIG. 12 is top view of the piezoceramic driver.

FIG. 13 is a side of the driver of FIG. 12.

FIG. 14 is an enlarged portion of the driver taken in the vicinity of lines 14—14 of FIG. 13.

FIG. 15 is a small scale perspective view of a prior art scanning mechanism about which the tape of FIG. 16 is wrapped, the mechanism further carrying the frame of the present invention.

FIG. 16 is an enlarged elevation view of a portion of video tape.

FIG. 17 is a schematic illustrating the operation of the frame and driver of the present invention when the driver is undeflected from its at rest position.

FIG. 18 is a schematic illustrating the operation of the frame and driver of the present invention in a deflected position.

FIG. 19 is a schematic illustrating the operation of the frame and driver of the present invention in a deflected position opposite to that shown in FIG. 18.

DESCRIPTION OF THE PREFERRED EMBODIMENTS OF THE INVENTION

The structure of the present invention is for mounting a magnetic transducing head 1 in relation to a recording medium such as a tape 3. The transducing head must be positioned to read information on a track 2 of the tape which is helically wound on a drum 4 as illustrated in FIGS. 15 and 16. The basic apparatus of the drum and tape mechanism is described in U.S. Pat. No. 4,099,211.

Referring to FIGS. 1 and 2, the improvements of the present invention consist briefly of a support element 5 which is mounted in a housing 6 which is connected to drum 4. An elongated laminated continuous driver member 7 is fixedly connected at a proximal end 30 to the support element 5 and is cantilevered toward the track of the magnetic record medium. The driver member 7 is a single deflectable member which is displaceable in directions lateral to the elongated track.

As illustrated in FIGS. 12-14, the driver member 7 is a thin deflectable leaf element such as a piezoelectric ceramic bender element. The driver may be manufactured by Piezo Electric Products, Inc. and identified as a G 1278 Piezoceramic Bender Element Poled for Parallel Operation. As shown in FIG. 14, the leaf element is composed of two piezoelectric ceramic layers 8 and 9, sandwiched and bonded between nickel plate electrode layers 10 and 11 and bonded as by epoxy layers to opposite sides of a brass vane member 12.

For structural and protective purposes, the driver member 7 may be mounted in an open-ended housing 6 composed of a base 13 and side walls 14 and 15. The driver member 7 is solidly mounted at one end between electrically insulating spacers 16 and 17 (FIG. 1). The driver member 7 is cut at an angle at its opposite distal end 20, forming coverging edges 18 and 19, thus reducing the mass of the driver member 7 at its distal end. Referring to FIGS. 1, 3, 4, and 5–8, an elongated frame assembly 21 is illustrated which is connected at a proximal end 22 to the proximal end 30 of the driver by outer blocks 23 and 24 and insulator blocks 16 and 17. The frame assembly 21 includes a pair of laterally spaced arms 25 and 26 cantilevered toward the track of the magnetic record medium.

Holding means 27 (FIG. 6) rigidly connects each of the arms 25 and 26 at a distal point. Torsion means 28 is connected to the distal end 20 of the driver member 7 (FIG. 3) and to the distal end (holding means 27) of the frame assembly 21. As illustrated in FIG. 1, the distal end of the driver member 7 is connected to the holding means 27 which in the drawing is the distal end 20 of the frame assembly 21.

A mounting means 29 (FIG. 3) connects the transducing head 1 to the distal end of the frame assembly.

The frame assembly 21 and the holding means 27 cooperate to maintain the transducing head 1 normal to the magnetic record medium at all lateral positions of the distal end 20 of the driver member 7 (FIGS. 17–19).

In order to minimize the mass of the frame assembly 21, the arms 25 and 26 are preferably constructed with spaced apart arm elements 31–34 whose distal ends 35–38 are connected to the holding means 27. In a further effort to reduce mass, the arm elements taper from a wide dimension at the proximal ends (FIG. 5) 39–42 to the distal ends.

The mounting means 29 (FIGS. 9–11) is a rigid element having laterally spaced arms 43 and 44 connected to the holding means 27 at spaced locations (FIGS. 2–4).

In the preferred embodiment, the arm elements 25 and 26 of the frame assembly 21 are constructed integrally with the holding means 27 (FIG. 6). As shown in FIG. 5, the holding means 27 includes a pair of cross members 45 and 46 which are attached to the corresponding distal ends of arms 31–34. The cross members 45, 46 are bent at 90 degree angles forming an end face 47 and lower and upper arm joining members 48 and 49. End tab members 50 and 51 are elongated portions of end face 47 and are bent at 90 degree angles and rigidly connected to distal arm element ends 35–38.

As shown in FIG. 1, the longitudinal edges 52 and 53 of the driver member 7 may be located between the pairs of arm elements 31–34. Damping means 54 and 55 may be mounted on the driver member 7 and contact the arm elements. The damping members may be made of plastic sponge, rubber, or other suitable material.

Torsion member 28 includes lugs 56 and 57 which are bent at right angles as shown in FIG. 3. An electrical insulator 58 separates the lugs from the end 20 of the driver 7.

Referring to mounting means 29, (FIGS. 8–11) arms 43 and 44 are each divided into fingers 61–64 with fingers 61 and 63 connected as by an adhesive to lower arm joining member 48 and fingers 62 and 64 connected to upper arm joining member 49.

The operation of the device resulting in holding the transducing head 1 at right angles to the tape 3 at all amplitudes is shown schematically in FIGS. 17–19. In FIG. 17 no bending force has been applied to driver member 7 so that it is straight and arm elements 32 and 34 are also straight and parallel to the driver member. The transducing head 1 is at right angles to tape 3.

In FIG. 18, an upward biasing force has been applied to driver member 7 so that the driver member moves in a counter clockwise direction and assumes a concave shape. Since the end 20 of the driver member 7 is rotated counter clockwise, torsion means 28 is also rotated or twisted counter clockwise. Because holding means 27, consisting of cross members 45 and 46 and end tab members 50 and 51 (FIGS. 6 and 7), is rigidly connected to arm elements 31–34, and torsion means 28 rotates independently, end face 47 remains parallel to tape 3 and transducing head 1 remains at right angles to the tape for the following reason. As driver member 7 rotates in a counter clockwise direction, the portions of arm elements 31–34 adjacent fixed proximal ends 39–42 also rotate in a counter clockwise direction. The portions of the arms beyond the midpoint and towards the distal ends 35–38 of arm members 31–34, however, rotate in a clockwise direction forming an "S" shaped curve.

Referring to FIG. 19, the driver member 7 has received a bending force causing it to deflect in a clockwise direction. In this case, the end 20 of the driver member 7 rotates in a clockwise direction and causes torsion member 28 to also rotate in a clockwise direction. For the same reasons previously discussed, the end face 47 (FIG. 6) remains in a position parallel to the tape 3 and the transducing head 1 remains perpendicular to the tape 3. In this instance, the portions of arm elements 31–34 adjacent fixed proximal ends 39–42 rotate in a clockwise direction while the portions of the arm elements beyond the approximate mid-portion and toward the distal ends 35–38 of the arm elements 31–34 rotate in a counter clockwise direction, thus forming an "S" shaped curve.

While FIGS. 18 and 19 present grossly exaggerated shapes of the members and represent the position of the transducing head 1 at the maximum amplitudes of upward and downward deflections, it is to be understood that the transducing head 1 remains at right angles to the tape 3 at all positions between maximum amplitudes in both directions.

What we claim is:

1. A structure for mounting a transducing head in transducing relation with an elongated track of a magnetic record medium supported in a plane perpendicular to the transducing head comprising:

a support element;

driver means;

a frame assembly having a pair of arms laterally spaced apart relative to said plane and fixedly connected at their proximal ends to said support element and cantilevered toward the track of the magnetic record medium and having distal ends rigidly connected to a distal end of said frame assembly which is driven laterally relative to said plane of the magnetic record medium by said driver means;

holding means rigidly connected to each of said arms at said distal end of said frame assembly for lateral movement therewith;

mounting means connecting the transducing head to said distal end of said frame assembly; and means integrally coupling said holding means to said frame driver means for rotational movement therebetween upon operation of said driver means to maintain the transducing head at a selected substantially constant angle to said plane of said magnetic record medium at all lateral positions of said holding means.

2. A structure as defined in claim 1 comprising:

said driver means includes a driver member fixedly connected at a proximal end to said support element and cantilevered toward said track of said magnetic record medium, said driver member is a single deflectable member for displacement of said holding means in directions lateral to said plane; and said coupling means comprises torsion means on said holding means connected to said distal end of said driver member for lateral movement therewith, and further being rotatably movable relative to said holding means upon movement of said holding means in said directions lateral to said plane.

3. A structure as defined in claim 2 wherein; said driver member is a piezoelectric element having axes of polarization extending in said lateral directions.

4. A structure as defined in claim 1 wherein:

each of said arms includes a pair of elongated spaced apart arm elements whose distal ends are connected to said holding means.

5. A structure as defined in claim 1 wherein:

said mounting means is a rigid element having laterally spaced arms connected to said holding means at spaced locations.

6. A structure as defined in claim 4 wherein:

said arm elements and said holding means are an integral element.

7. A structure as defined in claim 4 comprising:

said driver means having longitudinal edges located between said pairs of arm elements; and damping means mounted for touching contact between said driver means and said arm elements.

* * * * *